April 12, 1927.

G. TURNER ET AL 1,624,771

CONSTRUCTION OF WHEELS FOR ROAD VEHICLES

Filed July 27, 1923

INVENTORS
George Turner.
Joseph Eldred Bishop.
By their Patent Attorney
Fred Walsh Patented Apr. 12, 1927.

1,624,771

UNITED STATES PATENT OFFICE.

GEORGE TURNER, OF PARRAMATTA, NEAR SYDNEY, AND JOSEPH ELDRED BISHOP, OF MOSMAN, NEAR SYDNEY, NEW SOUTH WALES, AUSTRALIA.

CONSTRUCTION OF WHEELS FOR ROAD VEHICLES.

Application filed July 27, 1923, Serial No. 654,137, and in Australia March 26, 1923.

This invention refers to wooden wheels for road vehicles and relates particularly to those which carry heavy loads and so requiring wide tyres and it has been specially devised that wide felloes with grain of the wood approximately at right angles to the face of the wheel can be used and this without any or little possibility of the splitting where they overhang the spokes and further provide that they may be easily replaced when necessary by others.

Figure 1:
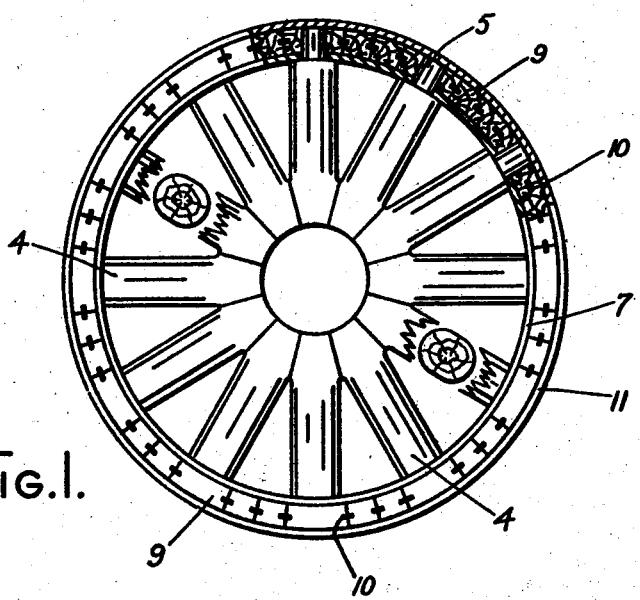
Figure 2:
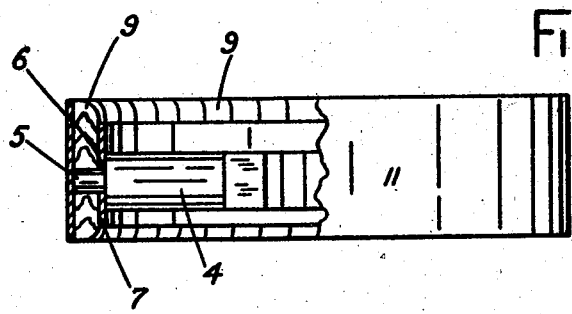
Figure 3:
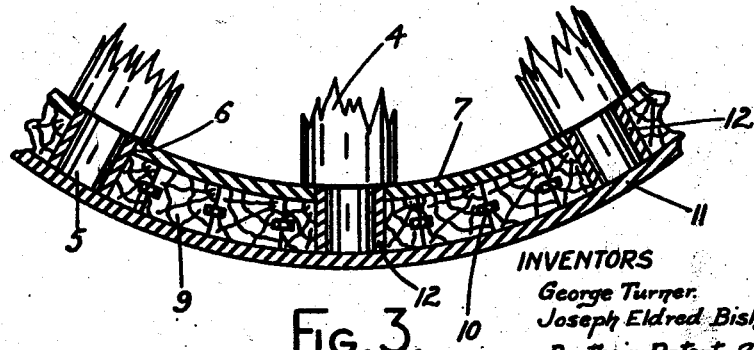

But in order that this invention may be more clearly understood and readily carried into practical effect the same will now be described with reference to the drawings accompanying and forming part of this complete specification. Fig. 1 is a part sectional front elevation and Fig. 2 a part medial sectional plan respectively of a wheel constructed according to these improvements while Fig. 3 is an enlarged part sectional elevation through the rim of same.

The wheel is constructed of a plurality of spokes 4 arranged radially and keyed together centrally to form the wheel and whose outer ends each have reduced part or tongue 5 shouldered on a flat circular metal ring 7 as a band or in sections and passing through though fitting an orifice 6 in said band and an orifice in the felloes 9 the whole forming the rim of said wheel. These felloes 9 being short radially and long transversely of the rim and of wood of grain running across the face of the wheel rim are bound together by dowels 10 and so kept in place on said band 7 while further a metal band 11 in whole for contact as a tyre with the road or a way or as a rim for a resilient shoe is shrunk over said felloes keying them firmly in position. Though it is preferred otherwise short thimbles 12 bedded in the felloes may be placed around the spoke tongues 5 for strengthening and protecting said tongues and the spokes against undue strain and if desired said thimbles might be integral with one or other of the bands 7 and 11. Although the felloes 9 shown in the drawings have their wood grain at right angles to the wheel face they might be of ordinary sawn or bent construction.

What we claim as our invention and desire to secure by Letters Patent is:—

In a wheel having a rim comprising a series of felloes of a definite circumferential width adapted to receive the spokes of the wheel and a plurality of felloes of a relatively smaller circumferential width disposed intermediate each pair of the said spoke receiving felloes; a longitudinally extending groove formed in the opposite radially extending sides of each of said felloes; and a strip fitted within the adjacently positioned grooves of the adjacent felloes.

In testimony whereof we have signed our names to this specification.

GEORGE TURNER.
JOSEPH ELDRED BISHOP.